Figure 1:
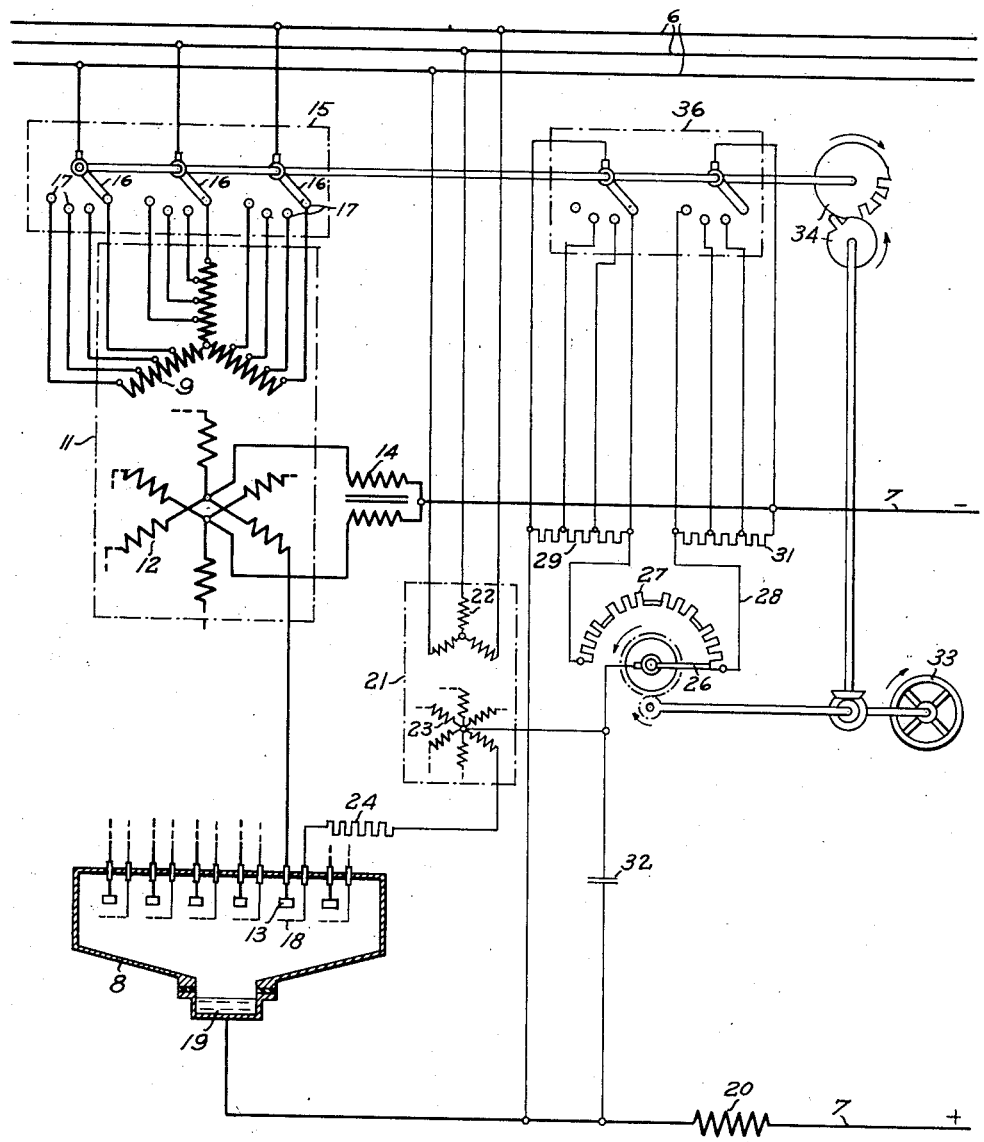

Patented Sept. 14, 1937

2,093,222

UNITED STATES PATENT OFFICE 2,093,222

ELECTRON DISCHARGE DEVICE CONTROL SYSTEM

Harold Winograd, Milwaukee, and Didier Journeaux, Wauwatosa, Wis., assignors to Allis-Chalmers Manufacturing Company, Milwaukee, Wis., a corporation of Delaware Application July 2, 1934, Serial No. 733,410

12 Claims. (Cl. 175—363)

This invention relates in general to control systems, and more particularly to means for controlling the flow of current through an electric translation system employing an electric valve provided with means for controlling the conductivity thereof.

Electric valves are frequently associated with suitable circuits to thereby constitute electric current translating systems such as alternating current rectifying, direct current inverting, frequency changing, direct current converting, motor controlling and other systems. It is then frequently desired to control such systems to permit adjusting of the output voltage thereof or the current intensity therein at continuously variable values. Such control generally cannot be attained by means of a transformer provided with taps for the reason that, if a substantially gradual control is required, it becomes necessary to utilize an excessive number of taps which render the equipment expensive and cumbersome. The gradual control of the flow of current may be obtained by controlling the conductivity of the valve by suitable mechanical, electrostatic, or electromagnetic means acting within the valve, but such control is advantageous only when a limited degree of regulation is required for the reason that the efficiency of the system and the power factor of alternating current flowing therethrough are thereby adversely affected. It is therefore preferable to combine the above mentioned two methods of control thus controlling the output of the system stepwise by means of a tap changer, and further gradually controlling such output within the limits of each of the several steps of the tap changer by modifying the conductivity of the valve. The controls of the tap changer and of the valve are then preferably coordinated in such a manner that operation of the tap changer over one step thereof leaves the output voltage of the system substantially unchanged, such voltage being regulated within each step of the tap changer by the action of the conductivity controlling means of the valve.

It is, therefore, one of the objects of the present invention to provide a control system for an electric valve in which the flow of current through the valve may be coordinately controlled by step-by-step controlling means and by gradually acting controlling means.

Another object of the present invention is to provide a control system for an electric valve in which the flow of current through the valve is coordinately controlled by circuit controlling means and by conductivity controlling means of the valve.

Another object of the present invention is to provide a control system for an electric valve so arranged that, upon movement of a tap changer over one step thereof, the output voltage of the system varies by an amount less than one step of the tap changer acting alone.

Another object of the present invention is to provide a control system for an electric valve so arranged that conductivity controlling means are employed to control the valve within the limits of each step of circuit controlling means.

Figure 2:
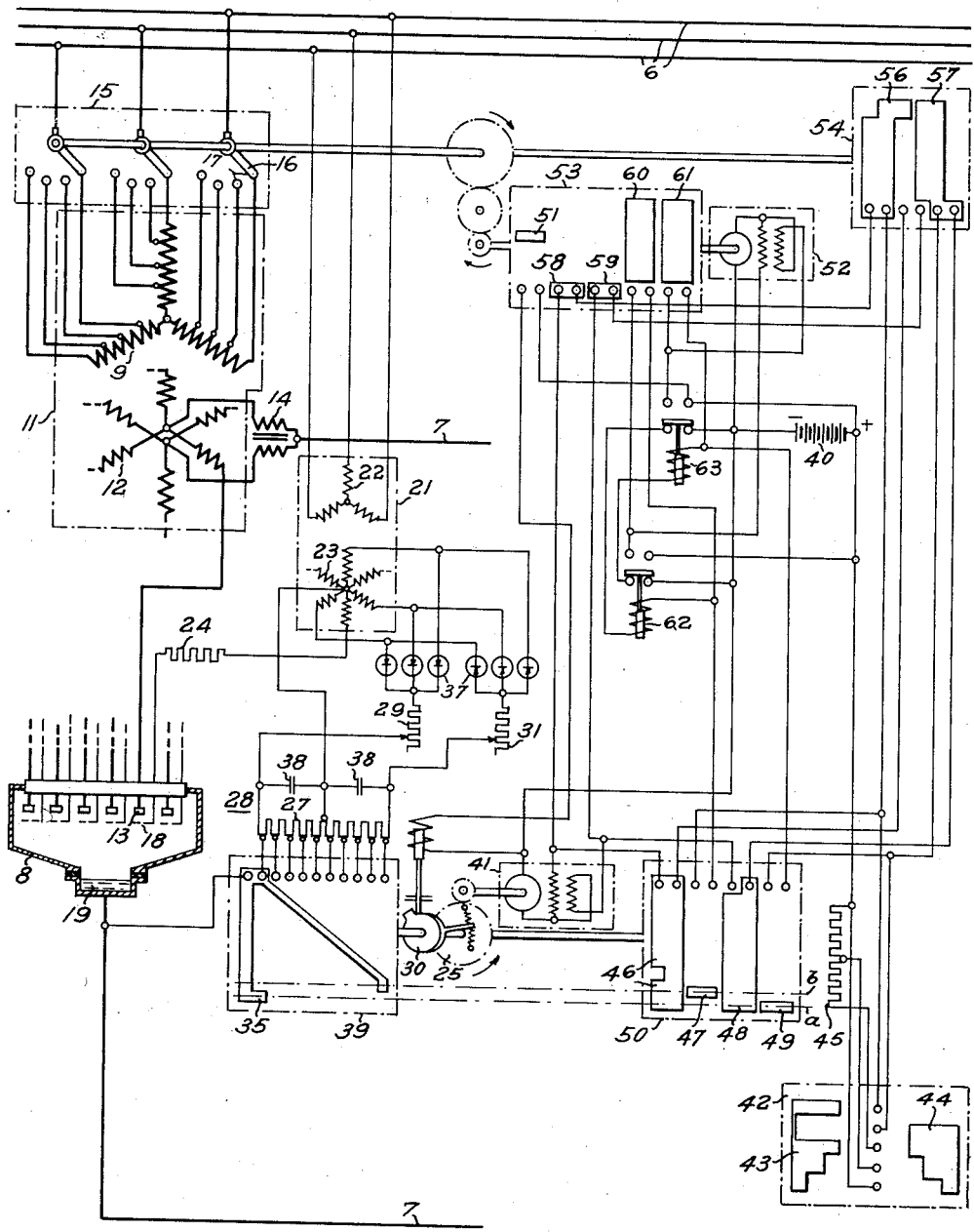
Figure 3:
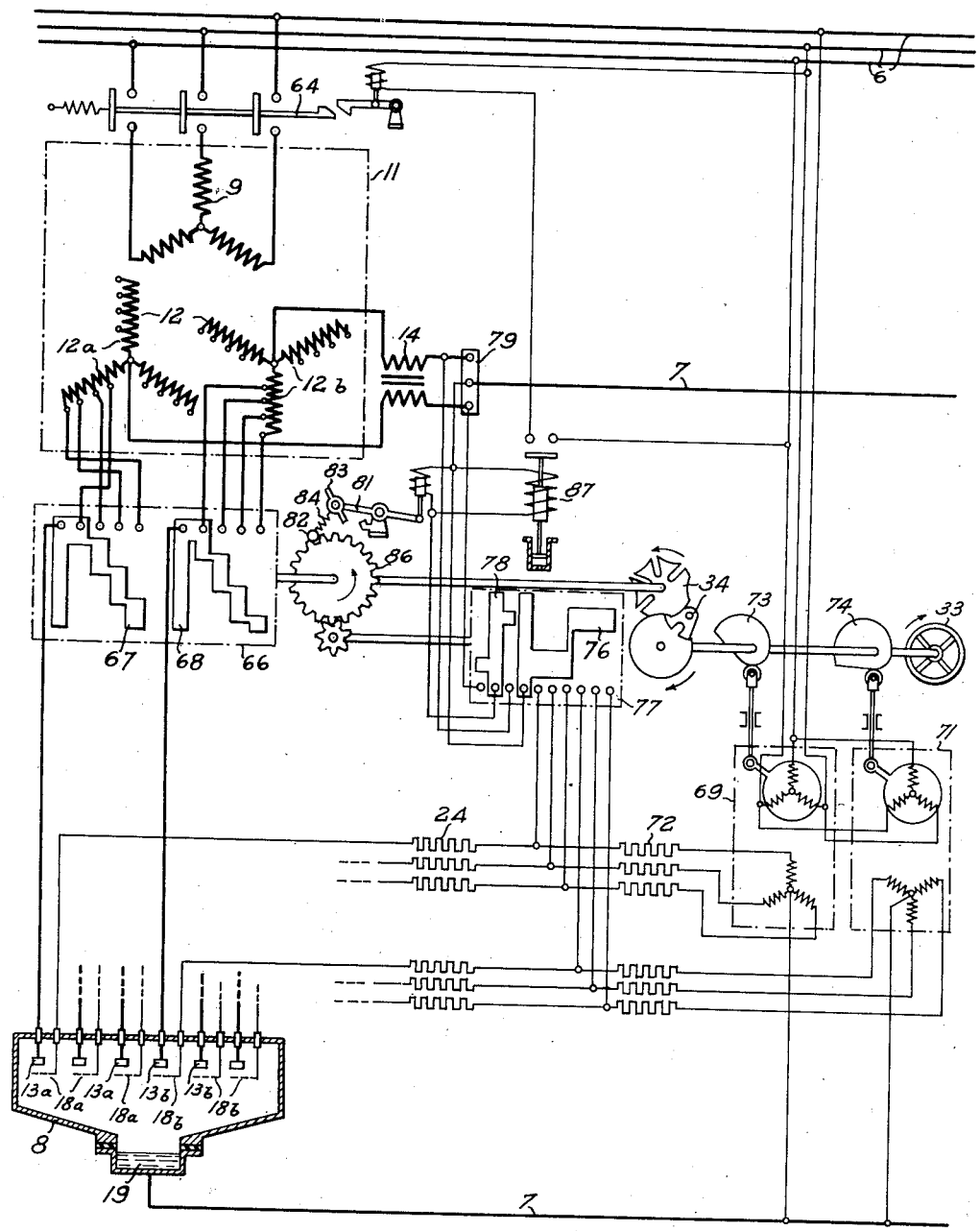
Figure 4:
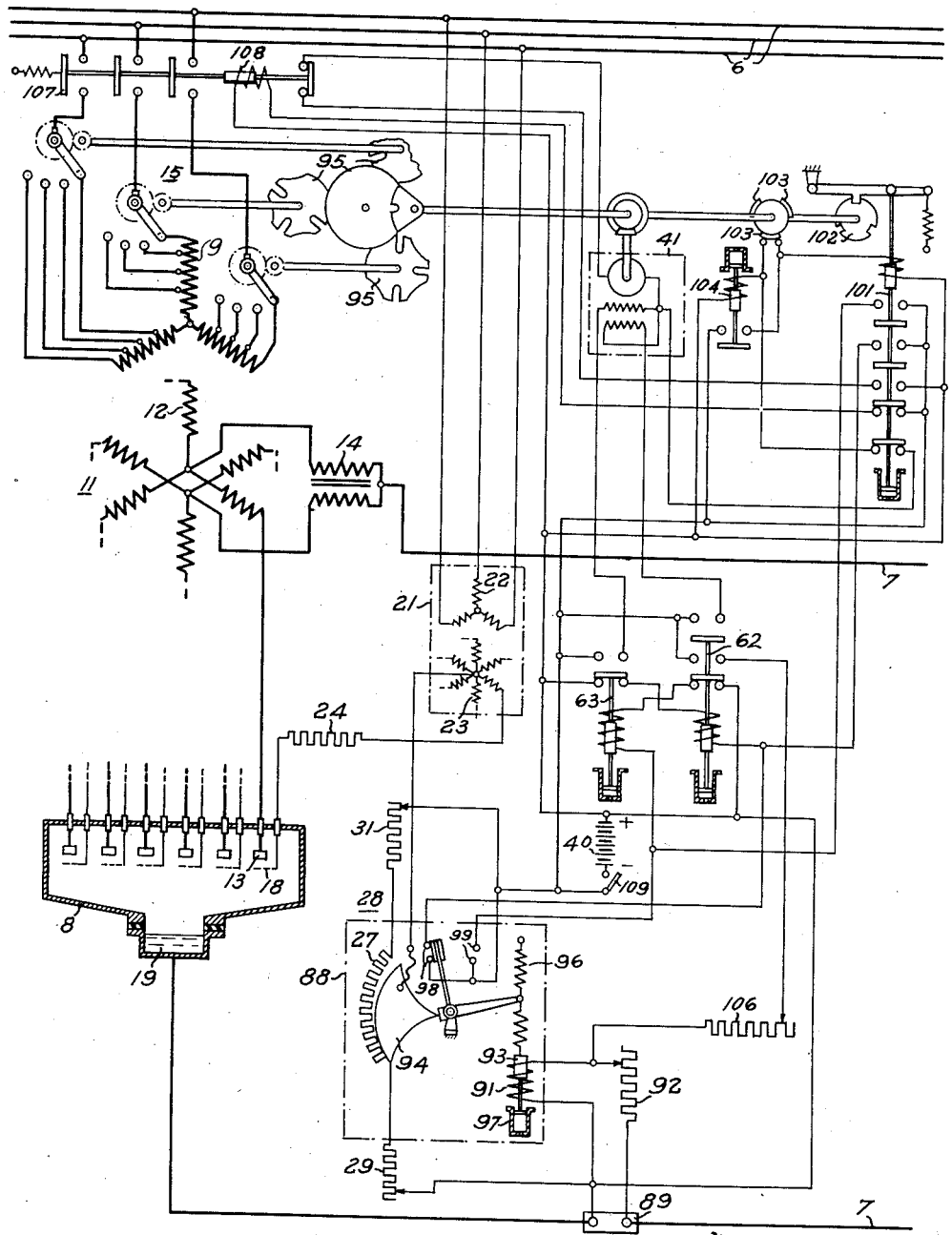
Figure 5:
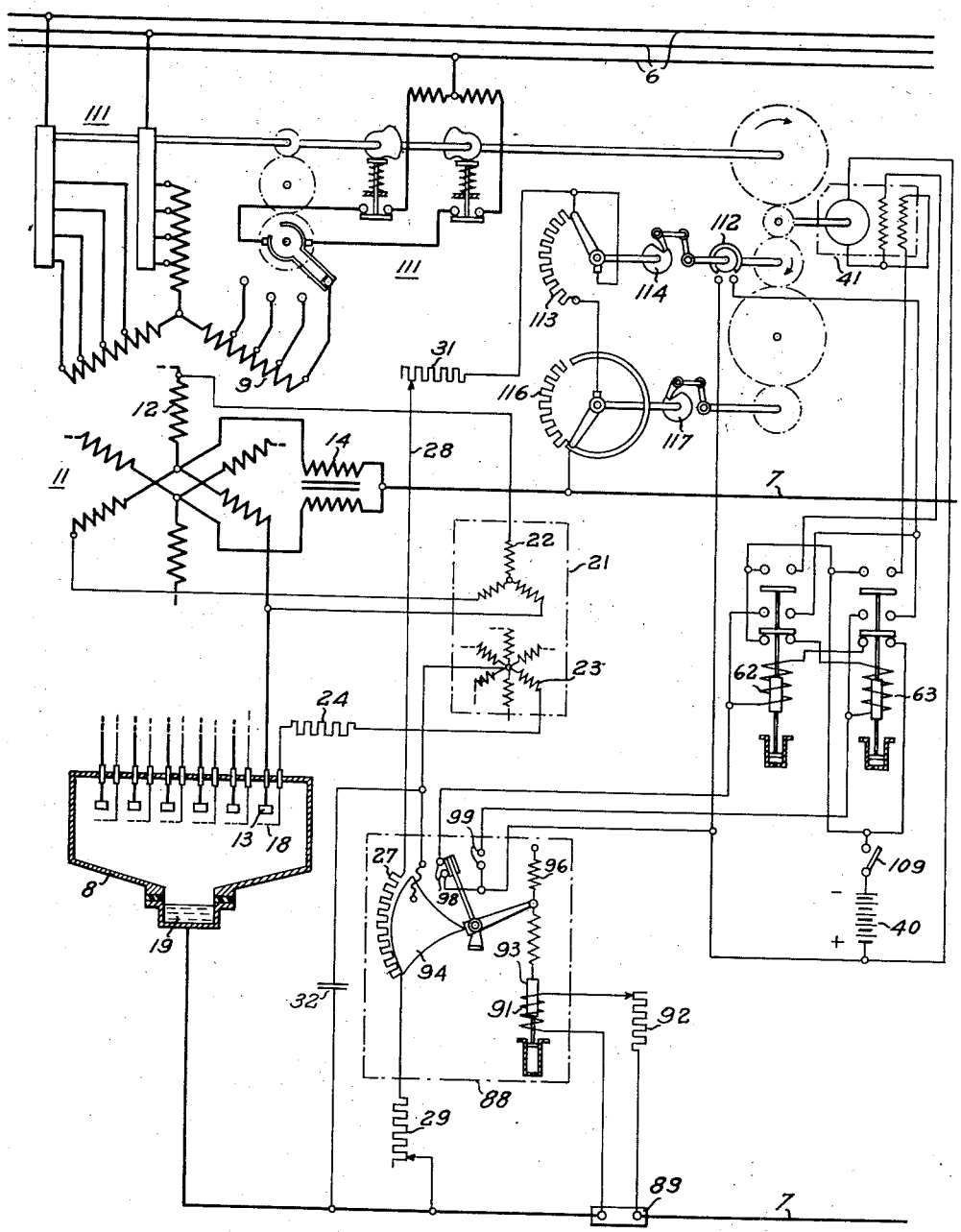

Objects and advantages other than those above set forth will be apparent from the following description when read in connection with the accompanying drawings, in which:

Figure 1 diagrammatically illustrates one embodiment of the present invention applied to the control of an electric valve operable for rectifying alternating current or inverting direct current, and in which the tap changer and the circuit of the control electrodes of the valve are controlled manually;

Figure 2 diagrammatically illustrates the modified embodiment of the present invention differing from the embodiment illustrated in Fig. 1 in that the operation of the system is obtained by means of remotely controlled motors, energized through interlocking circuits;

Figure 3 diagrammatically illustrates another modified embodiment of the present invention in which the flow of current is maintained through some of the anodes of the valve during any operation of the tap changer;

Figure 4 diagrammatically illustrates a further modified embodiment of the present invention in which the flow of current through the system is interrupted by means of a switch during operation of the tap changer; and Figure 5 diagrammatically illustrates another modified embodiment of the present invention in which the flow of current is maintained through all the anodes of the valve during operation of the tap changer.

Referring more particularly to the drawings by characters of reference, reference numeral 6 designates an alternating current line connected with direct current line 7 through an electric translation system including an electric valve 8, preferably of the vapor type, controlling the flow of current therebetween. In the description of the present and of the following embodiments it will be assumed that alternating current received from line 6 is to be rectified and supplied to line 7, but it will be understood that the system may be utilized for the converse operation by suitable readjustment of the elements thereof. It will also be understood that the control elements of the system may be utilized for controlling the operation of electric valves in systems other than alternating current rectifying or direct current inverting systems.

Line 6 is connected with the primary winding 9 of a transformer 11 having a secondary winding 12 comprising a plurality of phase displaced portions severally connected with the anodes 13 of valve 8. Winding 12 may be connected with line 7 either directly or through an interphase transformer 14 as is well known in the art. The ratio of transformation of transformer 11 may vary in steps of predetermined magnitudes by the action of suitable means such as a tap changer 15 varying the connections of winding 9 with line 6 as shown in Fig. 1, or by other means effective to vary the number of operating turns of winding 9 or of winding 12. The selection of the type of tap changing equipment utilized will depend on whether or not it is possible or desirable to interrupt the flow of current through the circuit during operation of the tap changer and upon whether or not such interruptions may be effected at the tap changer or must be made through a separate switch. Such choice, and the question of insertion of the tap changer in the primary or in the secondary winding of the transformer, will also be influenced by operating conditions such as the voltages of the respective windings and the current intensities therein which determine which type of tap changing equipment will be most economical.

As shown in Fig. 1, tap changer 15 is provided with a plurality of brushes or arms 16 each engaging with a plurality of contacts 17 of a type capable of withstanding arcing upon movement of the associated brush from one contact to another while the system is carrying current. Valve 8 is provided with a cathode 19 of any suitable type connected with one of the conductors of line 7 either directly or through the reactor 20, and is also provided with any discharge igniting and maintaining means necessary for operation of the particular type of cathode utilized, which means are well known and therefore not shown. The conductivity of valve 8 may be controlled by suitable means such as control electrodes 18 severally associated with the anodes 13, such control electrodes being, for example, of the type operable to prevent the flow of current through the associated anodes while the control electrode is maintained at a materially negative voltage with respect to the cathode, and to release the flow of current through the anode upon energization of the control electrode at a materially positive voltage with respect to the cathode.

Each control electrode receives an alternating voltage component similar to a voltage of winding 12 from an auxiliary transformer 21 having a primary winding 22 connected with line 6 and having a secondary winding 23 comprising a plurality of phase displaced portions connected to form a neutral point. Each control electrode 18 is connected with a portion of winding 23 through a current limiting resistor 24, and the neutral point of winding 23 is connected with the movable tap 26 of a rheostat 27 forming part of a voltage divider 28 connected across line 7. Such voltage divider also includes resistors 29 and 31 and is provided for the purpose of causing the superposing of a direct voltage component, obtained from line 7, on the alternating current component impressed on control electrodes 18 by winding 23. Suitable means, such as a capacitor 32 connected between the neutral point of winding 23 and cathode 19, may be provided for maintaining such direct voltage component substantially uniform irrespective of any alternating voltage components in the voltage of line 7.

Tap 26 is arranged to be moved by suitable driving means operated by a hand wheel 33 also arranged to drive tap changer 15 through an intermittent mechanism such as a Geneva gear mechanism 34. Rheostat 27 may be divided into a plurality of portions separated by conductive segments so arranged that tap 26 moves over one of the rheostat portions when tap changer 15 is at rest, and moves over one of the conductive segments while the tap changer is being operated. Tap changer 15 is rigidly connected with an auxiliary tap changer 36 arranged to simultaneously short circuit a portion of one of resistors 29 and 31 and to remove a short circuit across a portion of the other one of such resistors.

In operation, line 6 being energized and the several elements of the system being arranged as shown, the several anodes 13 of valve 8 are sequentially made positive with respect to cathode 19 and sequentially carry current impulses combining at cathode 14 into a substantially uniform direct current supplied to line 7. Resistor 29 is short circuited by tap changer 36, and rheostat 27 and resistor 31 are chosen of such values that tap 26 transmits a direct voltage component from line 7 and of comparatively high value to the control electrodes. As is well known, when the control electrodes of a vapor valve receives superimposed alternating and direct voltage components, if the direct voltage component is large and negative, the instants at which each control electrode becomes positive are retarded and the release of the flow of current through the associated anodes is delayed towards the later portion of the positive voltage half-cycle thereof whereby the output voltage of the valve is reduced to a corresponding extent. When such direct voltage component is reduced to zero or even reversed in sign, however, the moments of the voltage cycle at which the control electrodes become positive are advanced and the output voltage of the valve is increased to a corresponding extent. Tap changer 15 and tap 26 being in the position shown will thus cooperate to reduce the output voltage of the system impressed on line 7 to the greatest possible extent.

Upon movement of hand wheel 33 in a clockwise direction tap 26 moves over one of the portions of rheostat 27 to thereby decrease the magnitude of the direct voltage component impressed on the control electrodes, whereby the output voltage of the system is gradually increased until tap 26 reaches the first conductive segments inserted in rheostat 27. Further movement of hand wheel 33 causes tap 26 to move over the conductive segments and also causes tap changers 15 and 36 to be moved by one step through the agency of mechanism 34. Such movement of tap changer 15 causes the voltage impressed on anode 13 through winding 12 to be increased by a material value, in a single step and simultaneous movement of tap changer 36 causes short circuiting of one portion of resistor 31 and removal of the short circuit across a portion of resistor 29, whereby the value of the direct voltage component of control electrodes 18 is suddenly increased by a predetermined amount. Such increase causes the output voltage of the system to be decreased to a predetermined extent and the tap of resistor 29 and 31 may be so selected that the output voltage of the system is thus immediately either returned to the value of such output voltage obtained immediately before operation of tap changer 15, or is adjusted to a slightly higher value differing therefrom by an amount which is, in any case, less than the value of the step taken by tap changer 15.

The operation of the tap changer 15 is thus so compensated that the voltage of the system is adjusted without excessive discontinuity during operation of the tap changer even if the steps thereof are of comparatively large value. Further movement of hand wheel 33 causes tap 26 to engage with and move over another portion of rheostat 27 to thereby increase the output voltage of the system to a maximum value which is reached when tap 26 engages another conductive segment of the rheostat. Such sequence of operations is repeated for each step of the tap changer up to the last step thereof.

The operation of the system during counterclockwise movement of the hand wheel 33 to decrease the voltage of line 7 will easily be understood to be similar to that explained above. To obtain the most efficient and advantageous operation of the system, it is preferable that the maximum voltage obtained on each step be the voltage obtainable when each anode carries current at the earliest possible time of the voltage cycle thereof as obtained in the absence of control electrodes. Between successive operations of the tap changer the control electrodes then regulate the output voltage of the system to an extent corresponding to substantially the amount of one step of the tap changer, which amount may be considerably greater than is usually found in tap changers used in the art without rendering the operation of the system materially less efficient.

Tap changer 15 effectively controls the connection of valve 8 in the system by varying the connections of transformer 11 to thereby control the magnitude of the output voltage of the system in steps of predetermined magnitudes. Control electrodes 18 receive current from a source of control voltages comprising transformer 21 and voltage divider 28 to impress, between control electrodes 18 and cathode 19, voltages effective to control the conductivity of valve 8 and to variably control the magnitude of the output voltage of the system within substantially the limit of the steps of the tap changer. The operation of tap changer 15 and the adjustment of voltage divider 28 by tap changer 36 are coordinated so as to adjust the output voltage of the system at substantially equal values immediately before and immediately after operation of the tap changer, such values being either exactly equal or slightly different as may be the case but always differing by less than the amount of one step of the tap changer.

In the embodiment illustrated in Fig. 2 voltage divider 28 receives a rectified voltage from winding 23 through a plurality of rectifying devices 37. Such rectified voltage is rendered substantially uniform by suitable means such as capacitors 38 connected across the terminals of rheostat 27, and an intermediate point of the rheostat connected with the neutral point of winding 23. Rheostat 27 is variably connected with cathode 19 by means of the segment 35 of a controller 39 driven by a motor 41 through a flexible transmission 25. Controller 39 is also provided with a cam 30 abutting against an electrically operated latch when controller 39 reaches position "a" after causing the output voltage of valve 8 to decrease, and also when controller 39 reaches position "b" after causing the output voltage of valve 8 to increase; as will appear hereinafter, motor 41 then continues to rotate until controller 50 reaches position "b" or position "a" respectively, and controller 39 may then be allowed to suddenly reach such position by energizing the coil of the latch. The motor is energized from a battery 40 through segment 43 or 44 of a master controller 42, the motor driving the shaft of controller 39 in the counterclockwise direction when master controller 42 is moved to the right and in a clockwise direction when the master controller is moved to the left and at a speed depending on the amount of a resistor 45 inserted in the circuit of the motor by the master controller. The connections of the motor are completed through a plurality of segments 46 to 49 of a second controller 50 providing suitable interlocks between the motor, the master controller, and another motor 52 driving tap changer 15.

Motor 52 also drives an interlock controller 53 making one revolution for each step of tap changer 15 and another controller 54 moving at the same rate as tap changer 15 and serving as a limit switch to prevent over-travel thereof. Controller 53 is provided with segments 58 to 61 of which segments 58 and 59 cooperate with the segments of controller 50 in controlling the operation of motor 41, and of which the segments 60 and 61 cooperate with segments 47 and 49 in controlling the operation of relays 62 and 63 utilized for connecting motor 52 with battery 40. The control circuits for motors 41 and 52 are not described in greater detail as it is believed that such circuits will easily be followed by any one skilled in the art. It will be understood that the desired sequence of operation of motors 41 and 52 may also be obtained by means of other control circuits than those shown, if so desired.

In operation, line 6 being energized and the elements of the system being in the position shown in the drawing, the output voltage of the system is at a minimum value for the reasons already considered in the description of the operation of the embodiment illustrated in Fig. 1. Upon movement of master controller 42 to the right, the armature and one of the field windings of motor 41 are connected with battery 40 either directly or through resistor 45, depending upon the extent of movement of the master controller and through segments 56 and 58. Motor 41 thereupon moves at a speed depending upon the amount of resistance 45 connected therewith and drives the shaft of controller 39 in a counterclockwise direction to thereby gradually vary the connection of voltage divider 28 with cathode 19 and thus impress, on the control electrode, a decreasing negative direct voltage component which becomes equal to zero upon engagement of segment 35 with the tap of rheostat 27 connected with winding 23 and becomes increasingly positive to reach a maximum positive value upon engagement of segment 35 with the negative terminal of rheostat 27. The output voltage of the system is thus gradually increased from a minimum value to the maximum value obtainable with the tap changer 15 being in the position shown, as already explained with respect to Fig. 1.

Controller 50 brings segment 47 into engagement with the associated contacts to thereby energize the coil of relay 62 from battery 40. Upon energization of the coil of relay 62, such relay opens the connection of the coil of relay 63 which then cannot operate even if master controller 42 is reversed, and also connects the armature and one field winding of motor 52 with the battery 40. Motor 52 then drives the shaft of controller 53 in a clockwise direction, and segment 60 connects the coil of relay 62 with battery 40 through the contacts of the relay to maintain the relay and the motor energized even after segment 47 has disengaged from the contacts associated therewith. Such movement of controller 53 also opens the connection of motor 41 at segment 58 thus causing the motor to stop in position "a", while controller 39 is maintained in position "b" engaging cam 30 with the latch.

Continued movement of motor 52 drives the arms 16 of tap changer 15 from engagement with one set of contacts 17 to engagement with another set of contacts; at the instant of such changeover, a segment 51 of controller 53 connects the coil of latch with battery 40, and the latch releases cam 30 and controller 39, whereby the controller leaves position "b" and segment 35 disengages from one terminal of rheostat 27 and engages with the other terminal thereof at position "a". If, during such operation, controller 42 has been returned to the position shown, completion of one revolution by controller 53 causes the circuit of the coil of relay 62 to be opened at segment 60, whereby the relay deenergizes motor 52 and such motor stops. The circuit of motor 41 is then reestablished at segment 58 so that, upon renewed movement of controller 42 to the right, motor 41 will again drive controller 39 to increase the output voltage of the system to the maximum value obtainable when tap changer 15 is on the step reached thereby. The above sequence of operations is repeated for each step of the tap changer, movement of the tap changer over each step increasing the output voltage of the system by a predetermined material amount and simultaneous movement of controller 39 causing the direct voltage component of the control electrode voltage to be suddenly varied from a positive to negative value to thereby reestablish the output voltage of the system at the value of such voltage immediately prior to movement of the tap changer or to a value different therefrom to an extent less than one step of the tap changer. When tap changer 15 reaches the last step thereof, the connections of motor 41 are changed by segment 56 so that controller 39 can no longer reach the position at which such controller causes motor 52 to start.

As will readily be seen by one skilled in the art, movement of master controller 42 to the left causes tap changer 15 and controller 39 to operate in a manner opposite to that described above to gradually lower the output of voltage of the system from the maximum value thereof to the minimum value thereof. If controller 42 is maintained in such position the elements of the system finally reach the position shown in the drawings. During such operation motor 41 is generally energized from battery 40 through segment 44 of master controller 42 and segments 57 and 59 to drive the shaft of controller 39 intermittently in a clockwise direction. During movement of controller 54 of the tap changer 15 to the position shown from the adjacent position, segment 57 opens the connection of segment 44 with segment 59, and motor 41 is thereafter energized through segments 44, 57 and 48. Such segments complete the connection of motor 41 with battery 40 until controller 50 reaches the position shown whereupon such connection is opened and motor 41 stops. In the position then reached by controller 50, relay 63 is not energized through segment 49 as would occur if controller 50 reached position "a" thereof, so that motor 52 cannot be energized to drive tap changer 15 beyond the first position thereof. The operation of segment 56 in limiting the upward movement of tap changer 15 is similar to that above described in regard to segment 57.

In the embodiment illustrated in Fig. 3, winding 9 is not provided with taps and is connected with line 6 through the contacts of a circuit breaker 64. Winding 12 is then provided with taps for varying the number of effective turns thereof as by varying the connections of anodes 13 therewith. Such connections are effected through a tap changer 66 which may be of the controller type driven by hand wheel 33 through intermittent mechanism 34. The tap changer is provided with a plurality of segments as at 67 and 68 each connecting one anode 13 with one portion of winding 12 and so arranged that the connections of anodes $13a$ with portions $12a$ of winding 12 are effected simultaneously, but not simultaneously with the change of connections of anodes $13b$ with winding portions $12b$. The connections of one group of anodes such as $13a$ may thus be changed while current is still flowing through the second group of anodes such as $13b$ so that the flow of current through valve 8 is always maintained through the one or the other group of anodes.

In the present embodiment only, control electrodes 18 are assumed to receive only alternating voltages with respect to cathode 19, such voltages being obtained from line 6 through phase shifters 69 and 71 and through resistors 24 and additional resistors 72. The position of phase shifters 69 and 71 and therefore the phases of the output voltages thereof may be adjusted by means of cams 73 and 74 actuated by handwheel 33 and connected with the rotors of the phase shifters by suitable linkages. The cams are identical in the portions thereof which are effective while the tap changer is at rest and are so shaped that when the tap changer is in operation the phase shifters are sequentially moved from one limit position to the other as will appear hereinafter.

During operation of the tap changer, the control electrodes associated with the group of anodes being reconnected are connected with a suitable source of negative potential such as the negative conductor of line 7 through segment 76 of a controller 77 making one revolution for each step of tap changer 66, such connection being provided to cause interruption of the flow of current through the anodes then being reconnected by the tap changer. Controller 77 is also provided with a segment 78 effecting connections between a double shunt 79 inserted between line 7 and interphase transformer 14 and the coil of suitable protective devices provided for preventing further operation of the tap changer in the event that some or all of the control electrodes associated with the anodes being reconnected have failed to interrupt the flow of current therethrough so that further operation of the tap changer would cause detrimental arcing at the contacts thereof. Such protective devices may include an electric lock 81 operable to cause engagement of one or other end of a double pawl 83 with a gear 86 mounted on the shaft of the tap changer. The pawl is provided with a follower 82 connected thereto through a spring 84 and resting on the teeth of gear 86 whereby the follower is dragged in the direction of rotation of the gear. Upon energization of the coil of lock 81, one of the pawls 83 engages with gear 86 thereby preventing further motion of the gear in the direction of motion thereof but permitting reversal of the direction of motion of the tap changer to restore the previously obtained connections. Segment 78 may also control the connection of the coil of a time delay relay 87 with shunt 79, such relay having contacts in circuit with the trip coil of circuit breaker 64 to cause tripping of the circuit breaker 64 if the tap changer is maintained in an intermediate position as a result of operation of lock 81.

In operation, line 6 being energized and phase shifters 69 and 71 being in the position shown, it is assumed that the voltages impressed on the control electrodes from the phase shifters are given a maximum amount of lag and that, upon closure of circuit breaker 64, the flow of current through valve 8 will occur at a minimum output voltage as a result of the adjustment of the phase shifters and of the connection of the anodes on the lowest tap of the tap changer. Upon movement of hand wheel 33 in a clockwise direction, cams 73 and 74 gradually vary the adjustment of the phase shifters in identical manner to gradually advance the phase of the control electrode voltages and thereby gradually increase the output voltage of the system to the maximum value obtainable with the connection effected through the tap changer. When such condition is reached further movement of hand wheel 33 causes engagement of mechanism 34 to effect the following sequence of operation:

1. Segment 76 connects the control electrodes 18a with the negative conductor of line 7, the negative voltage of such conductor overcoming the voltages received by the control electrodes from phase shifter 69 and causing the flow of current to cease through winding portions 12a, segment 67 and anodes 13a.

2. Segment 78 connects the coils of lock 81 and relay 87 with the lower half of shunt 79. If for any reason one or all of control electrodes 18a have failed to interrupt the flow of current through the associated anodes current will flow through the coils of lock 81 and relay 87 and the lock will prevent further motion of the tap changer in the original direction of motion thereof but will permit return of such tap changer to the position shown in the drawings. If, however, the tap changer is left in the position reached thereby, relay 87 will cause tripping of circuit breaker 64 after a predetermined time delay. If on the other hand the control electrodes have functioned properly, winding positions 12a and anodes 13a are without current and the entire load is carried by winding portions 12b and anodes 13b through the upper coil of interphase transformer 14 which simply acts as a saturated reactor.

3. Anodes 13a are disconnected from the lowest tap of winding portion 12a.

4. The anodes are reconnected with the next higher tap of such winding portions.

5. Segment 78 disconnects the coils of lock 81 and of relay 87 from shunt 79; and 6. Segment 76 disconnects control electrodes 18a from the negative conductor of line 7.

During such sequence of operations cam 74 leaves the adjustment of phase shifter 71 unaltered so that the flow of current through winding 12b occurs at the same voltage as before initiation of the tap changing operation. Cam 73 on the contrary returns phase shifter 69 to the position shown in the drawings to again retard the moment of release of the flow of current through anodes 13a and decrease the output voltage of such anodes to an extent compensating for the increase given to such output voltage by the phase shifting operation above described. Upon reestablishment of the flow of current through winding portions 12a and anodes 13a the average output voltages of the two groups of anodes are thus equal and the groups of anodes are caused to operate in parallel by the action of interphase transformer 14 as before the initiation of the tap changing operation.

Further movement of handwheel 33 causes the connection of anodes 13b with winding portions 12b to be changed in a manner similar to that above described. After completion of such operation cams 73 and 74 and controller 77 are returned to the position shown in the drawings and the voltage of the system is still maintained at the value of such voltage immediately before initiation of the phase shifting operation without having varied materially during such operation. Further movement of handwheel 33 will cause the voltage to be raised further in the manner above described. Such sequence of operation is repeated for every step of tap changer 66, overtravel of the tap changer in either direction of motion being prevented by the limiting action of mechanism 34.

In the embodiment illustrated in Figure 4 the control electrodes 18 are energized in a manner similar to that illustrated in Figures 1 and 2 with the exception that voltage divider 28 is energized from battery 40 through a switch 109. In the present embodiment the operation of the tap changing and conductivity controlling means is obtained in response to an operating condition of the valve by means of a regulator 88. Such regulator is shown connected with a shunt 89 inserted in line 7 to operate in response to the magnitude of the flow of current therethrough, but it will be understood that the regulator may also be made responsive to any other operating condition of the system. The regulator includes a solenoid 91 connected with shunt 89 through a resistor 92 and acting on an armature 93 connected with the movable tap of rheostat 27 which is then preferably made in the shape of a rocking sector 94. Such action is obtained against the action of suitable restraining means such as a spring 96, the regulator being further provided with suitable damping means 97. In the present embodiment tap changer 15 is shown arranged for sequentially changing the connections of the several phases of winding 9 as a result of the connections thereof with motor 41 through an intermittent operating mechanism 95 but it will be understood that all three phases of winding 9 may be switched simultaneously as in Figs. 1 and 2. Relays 62 and 63 controlling the energization of motor 41 of the tap changer may be energized through contacts 98 and 99 of regulator 88. Such relays also control the energization of a latch 101 engaging with a notched wheel 102, mounted on the shaft of tap changer 15, and of a notching relay associated therewith, the energization of the latch and of the relay being controlled through contacts of the latch and through contacts 103 controlled by the shaft of tap changer 15. During certain operating periods of the system, solenoid 91 may also be energized from battery 40 through a resistor 106 as will appear hereinafter. The connection of tap changer 15 with line 6 is effected through a circuit breaker provided with a closing and holding coil 108 energized through contacts of latch 101, the circuit breaker being provided to interrupt the flow of current through the system during operation of tap changer 15.

In operation, line 6 being energized, upon closure of switch 109 the closing coil 108 of circuit breaker 107 is energized and the circuit breaker closes thereby causing the flow of energy between line 6 and line 7 to be established. The magnitude of the flow of current in line 7 depends upon the impedance of the current consuming devices connected therewith and a current proportional thereto flows through solenoid 91 of regulator 88. If such flow of current is of sufficient magnitude solenoid 91 attracts armature 93 against the action of spring 96 to thereby vary the point of connection of tap 94 of rheostat 27. Such action results in an increase in the value of the direct voltage component impressed on control electrodes 18 through rheostat 27, whereby the output voltage of the system is reduced to such an extent that the flow of current is limited to the predetermined value desired therefor for which the regulator is adjusted. When the load resistance fluctuates the regulator moves in the one or the other direction to tend to maintain the flow of current through line 7 at a constant value. If initiation of the flow of current through each anode is delayed to a considerable extent during the positive voltage half cycle of such anode the value of the current will depend not only on the load resistance but on the entire load impedance, because the inductance of the load circuit affects the wave shape and magnitude of the voltage and current of the direct current line 7.

If the load impedance increases to a sufficient extent the regulator returns to the position shown to cause the output voltage of the system to reach the maximum value thereof obtainable for the connection shown for tap changer 15. The regulator then closes contacts 98, thereby energizing the coil of relay 62 which closes the contacts thereof. Relay 62 is provided with time delay means to insure the operation thereof only if contacts 98 remain closed for a sufficient length of time, thereby avoiding unnecessary operation of the system upon transitory decrease of the flow of current through line 7. Closure of the contacts of relay 62 energizes the coils of relay 104 and of latch 101 through one of the field windings of motor 41 and through contacts of the latch. Relay 104 closes the contacts thereof, thereby connecting the coil thereof and the coil of latch 101 with battery 40 independently of relay 62 and of the contacts of the latch. Latch 101 also operates and connects the coil of relay 62 directly with battery 40 independently of contacts 98, whereby relay 62 maintains the contacts thereof closed until completion of the tap changing operation.

Relay 62 also connects solenoid 91, in parallel with rheostat 92 and shunt 89, across battery 40 whereby such solenoid receives a current greater than the normal current of line 7 and causes the regulator to move to the extreme position opposite to that shown in the drawings. The regulator thus opens contact 98 but the coil of relay 62 remains energized through the contact of latch 101. The regulator then closes contact 99 in the circuit of the coil of relay 63, but such relay does not operate because the circuit of the coil thereof is opened by contacts of relay 62. Latch 101, having operated, opens contacts in the circuit of closing coil 108 of circuit breaker 107 and the circuit breaker opens under the action of the spring thereof. Further contacts of latch 101 complete the circuit of the armature and of one of the field windings of armature 41 through the contact of relay 62, and motor 41 drives the shaft of tap changer 15 in a clockwise direction. During such movement the circuit of the coil of relay 104 is opened momentarily at contacts 103 and relay 104 returns to the position shown thereby deenergizing the coil of latch 101. Latch 101 however remains in the position reached thereby because of the engagement thereof with the rim of wheel 102 and returns to the position shown only upon engagement thereof with another notch of the wheel. Such engagement occurs upon completion of the tap changing operation of one phase of winding 9, the coils of relay 104 and of latch 101 remaining unenergized until then even upon closure of the circuit thereof through another contact 103 for the reason that the circuit thereof is interrupted both at contacts of the relay and at contacts of the latch.

Upon re-engagement of the latch with a notch of wheel 102 the latch opens the circuit of motor 41 so that the motor stops and the tap changer is positively maintained, in the position reached thereby, by means of the latch. The circuit of the coil 108 is then reclosed by the latch and the circuit breaker recloses, thereby reestablishing the flow of current through the system. The output voltage of the system is increased by movement of the tap changer, such increase being compensated by reversal of the regulator so that the value of such voltage immediately after the tap changing operation is the same as immediately before the tap changing operation. The latch also opens the circuit of the coil of relay 62 which returns towards the position shown, thereby disconnecting solenoid 91 from battery 40. The regulator then departs slightly from the extreme position, opposite to the position shown, to open contacts 99 so that, when relay 62 returns to the position shown, the coil of relay 63 is not unnecessarily energized.

If the impedance of the load circuit increases further the regulator will return towards the position shown and, upon reclosure of contacts 98, will initiate a further tap changing operation similar to that described above. The operation of tap changer 15 beyond the extreme positions thereof may be prevented by the use of suitable limit switches or controllers such as the controller 54 illustrated in Fig. 2, such controller being omitted in the present figure to simplify the drawings.

If the impedance of the load circuit is decreased the current in line 7 will tend to exceed the value desired therefor and regulator 88 moves towards the position opposite to the position shown, the regulator closing contacts 99 if the load impedance is decreased to a sufficient extent. Such operation causes operation of relay 63 which energizes the coils of relay 104 and of latch 101 in the manner explained above, such energization however occurring through the field coil of motor 41 not previously utilized. Relay 104 and latch 101 operate as above explained and cause circuit breaker 107 to open and motor 41 to rotate in the direction opposite to the direction of rotation of the motor in the operation explained above. Upon opening of circuit breaker 107, regulator 88 immediately returns to the position shown whereby contacts 99 are opened and contacts 98 are closed, such operation being however without effect on the operation of relays 62 and 63. Upon completion of the tap changing operation the circuit breaker recloses to reestablish the flow of current through the system at a voltage which is lower than the voltage obtained previously, such decrease in the voltage being however compensated by the reversal of the regulator so that the output voltage of the system actually remains at the value obtained for such voltage immediately before operation of the tap changer.

In the embodiment illustrated in Fig. 5, line 6 is connected with winding 9 through a tap changer 111 represented as being of a type in which the current in each phase may flow through two parallel branches connected by an auto-transformer. It is also understood that such connection may be permanently maintained even when the two sides of each auto-transformer are connected across adjacent taps of the transformer winding. The circuits of motor 41 and of the relays 62 and 63 differ somewhat from those shown in Fig. 4 for the reason that, in the present embodiment, the regulator does not suddenly reverse during passage of the tap changer from one step to the adjacent step but reverses slowly after completion of the tap changing operation. Each tap changing operation is effected by half a revolution of the tap changer shaft and the holding circuits of the relays 62 and 63 are completed through a contact 112 mounted on a shaft making one full revolution for each tap changing operation. The voltage divider 28 comprising rheostats 29 and 31 and resistor 27 also includes a rheostat 113 operated from motor 41 through a uni-directional clutch 114 whereby the arm of the rheostat is operated only when the voltage is being raised, the entire rheostat remaining in circuit when the tap changer is not operating. The voltage divider also includes a second rheostat 116 operated by motor 41 through another uni-directional clutch 117 whereby such rheostat is operated only when the voltage is being lowered and is short circuited while the tap changer is not operating. Winding 22 is energized from winding 12, so that the alternating and direct voltage components of control electrodes 18 are of values in a ratio which varies only slightly under the action of regulator 88, and which returns to identical values on each step of the tap changer. The regulating range of the regulator then remains uniform from step to step to permit reducing the output voltage of the system in a constant proportion on each step.

In operation, line 6 being energized, the flow of current through valve 8 is established as previously explained and the regulator remains in the position shown if the magnitude of such flow of current is less than the value for which regulator 88 is adjusted. The regulator then closes contact 98, thereby energizing the coil of relay 62. Relay 62 closes the contacts thereof, thereby closing the circuit of the armature and of one field coil of motor 41, and the motor drives the shaft of the tap changer in the clockwise direction and also drives the arm of rheostat 113 through clutch 114. Such movement causes closure of contact 112 which maintains relay 62 in the attracted position even if regulator 88 opens contact 98 thereof. During the operation, the tap changer opens one of the connections of the auto-transformer with the tap changer contacts and thereafter connects the auto-transformer across adjacent contacts as is well known in the art. Such reconnection causes the output voltage of the system to be suddenly increased by an amount equal to one-half the voltage of the winding section between the adjacent taps. At the moment of such connection the arm of rheostat 113 short circuits the entire rheostat so that the increase in the output voltage of the system due to the tap changing operation is compensated by a substantially equal decrease resulting from an increase in the value of the direct voltage component impressed on control electrodes 18. In the present embodiment also therefore the output voltage of the system remains substantially the same immediately before and immediately after the operation of the tap changer. During such operation the regulator has not moved and upon completion of the tap changing operation further rotation of motor 41 causes rheostat 113 to be gradually reinserted in the circuit of voltage divider 28. During such gradual reinsertion the output voltage of the system is thereby gradually increased until the current in the output circuit reaches the value for which the regulator is adjusted, and is thereafter accompanied by a gradual reversal of regulator 88 from the position shown to a position adjacent the extreme positions thereof opposite to the position shown in the drawings to prevent the flow of current from exceeding such value. Upon completion of such operation the circuit of the coil of relay 62 is opened at contact 112 and motor 41 stops. If the flow of current through line 7 decreases further, regulator 88 will return to the position shown to initiate another operation of tap changer 111 bringing both leads of the auto-transformer thereof in contact with the tap adjacent the end tap of each winding. During such operation the output voltage is again given a sudden increase which is again compensated by operation of rheostat 113 in the manner above explained.

If the load current increases above the value for which regulator 88 is adjusted, such regulator moves to the position opposite to the position shown to thereby close contacts 99 and thereby initiate an operation of tap changer 111 opposite to that described above. During such operation the output voltage is suddenly decreased, such decrease being however compensated by sudden insertion of rheostat 116 in the circuit of voltage divider 28, such rheostat being thereafter gradually removed from the circuit to cause the regulator to gradually return to a position adjacent the position shown. Upon further increase of the flow of current the regulator alone will return such flow of current to the normal value thereof unless the load impedance be decreased to such extent that the regulator again reaches the extreme position thereof to close contacts 99 and initiate another operation of tap changer 111.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an electric current supply line, an electric current output line, one of said lines being a direct current line, an electric translating system including a transformer, an electric valve having an anode with an associated control electrode and a cathode connected with said lines for controlling the flow of current therebetween, a tap changer for varying the connections of said transformer to control the magnitude of the voltage of said output line in steps of predetermined magnitudes, an auxiliary transformer for impressing an alternating voltage component between said control electrode and said cathode similar to a voltage of the first said transformer, a voltage divider connected across said direct current line, a movable tap of said voltage divider being connected with said transformer to superpose on said alternating voltage component a gradually variable direct voltage component, a second tap changer for stepwise controlling the connections of said voltage divider to stepwise vary the magnitude of said direct voltage component, and means for alternately varying the connection of said movable tap with said voltage divider and causing simultaneous operation of said tap changers, whereby the voltage of said output line is adjusted at substantially equal values immediately before and immediately after operation of said tap changer.

2. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, an auxiliary transformer for impressing an alternating voltage component between said control electrode and said cathode similar to a voltage of the first said transformer, a source of direct current, a voltage divider connected with said source and with said auxiliary transformer, a movable tap on said voltage divider connected to cause superposition of a gradually variable direct voltage component on said alternating voltage component, means for co-ordinately moving said tap and initiating operation of said tap changer, and means for automatically causing completion of the operation of said tap changer independently of said means.

3. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, an auxiliary transformer for impressing an alternating voltage component between said control electrodes and said cathode similar to a voltage of the first said transformer, a voltage divider connected with said auxiliary valves and with said auxiliary transformer, means for impressing a substantially uniform direct voltage on said voltage divider, a movable tap on said voltage divider connected to cause superposition of a gradually variable direct voltage component on said alternating voltage component, means for alternately varying the connection of said movable tap with said voltage divider and initiating simultaneous operation of said tap changer and of said movable tap whereby the voltage of said output line is adjusted at substantially equal values immediately before and immediately after operation of said tap changer, and means for causing completion of the said simultaneous operation of said tap changer and of said movable tap independently of the second said means.

4. An electric translating system including an electric valve having a pair of anodes with associated control electrodes and a cathode, a transformer for connecting said valve in said system, a tap changer for sequentially effecting variable connections between said transformer and each of said anodes to control the magnitude of the output voltage of said system in steps of predetermined values, said anodes normally operating at voltages of equal magnitudes on each step, means for impressing between each of said control electrodes and said cathode a voltage of sign and magnitude effective to cause interruption of the flow of current through the associated anode, and means interlocking the said tap changer with the first said means to sequentially effect interruption of the flow of current through one of said anodes, to change the connection thereof, reestablish the flow of current therethrough, to effect interruption of the flow of current through the other one of said anodes, and to change the connection thereof and reestablish the flow of current therethrough.

5. An electric translating system including an electric valve having a pair of anodes with associated control electrodes and a cathode, a transformer for connecting said valve in said system, a tap changer for sequentially effecting variable connections between said transformer and each of said anodes to control the magnitude of the output voltage of said system in steps of predetermined values, said anodes normally operating at voltages of equal magnitudes on each step, a source of control voltages for said control electrode, means for impressing voltages from said source between said control electrode and said cathode effective to variably control the magnitude of the output voltage of said system within substantially the limits of said steps, means for impressing between each of said control electrodes and said cathode a voltage effective to cause interruption of the flow of current through the associated anode, and means interlocking the first said means with the second said means and with the said tap changer to sequentially effect interruption of the flow of current through one of said anodes, to change the connection thereof and reestablish the flow of current therethrough, to effect interruption of the flow of current through the other one of said anodes, to change the connection thereof and reestablish the flow of current therethrough whereby the output voltage of said system is adjusted at values differing by materially less than the amount of one of said steps immediately before and immediately after operation of the first said means.

6. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, a source of control voltages for said control electrode, means for impressing voltages from said source between said control electrode and said cathode effective to variably control the magnitude of the output voltage of said system within substantially the limits of said steps, and means responsive to an operating condition of said system for coordinately controlling the operation of said tap changer and of the first said means to adjust the output voltage of said system at values differing by materially less than the amount of one of said steps immediately before and immediately after operation of the first said means.

7. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, means for interrupting the flow of current through said tap changer, a source of control voltages for said control electrode, means for impressing voltages from said source between said control electrode and said cathode effective to variably control the magnitude of the output voltage of said system within substantially the limits of said steps, and means responsive to an operating condition of said system for coordinately controlling the operation of said tap changer and of the first and second said means to cause deenergization of said tap changer during movement thereof and to adjust the output voltage of said system at substantially equal values immediately before and immediately after operation of the first said means.

8. An electric translating system including an electric valve having a plurality of anodes with an associated control electrode and a cathode, a transformer for connecting said valve in said system, means for varying the connections of said transformer to control the magnitude of the output voltage of said system in steps of predetermined magnitudes and for maintaining the flow of current through said system during operation thereof, a source of control voltages for said control electrodes, means for impressing voltages from said source between said control electrodes and said cathode effective to variably control the magnitude of the output voltage of said system within substantially the limits of said steps, and means interlocking the first said means with the second said means to adjust the ouput voltage of said system at values differing by materially less than the amount of one of said steps immediately before and immediately after operation of the first said means.

9. An electric translating system including an electric valve having an anode with an associated control electrode and a cathode, a transformer for connecting said valve in said system, a tap changer for varying the connections of said transformer to control the magnitude of the output voltage of said system in steps of predetermined magnitudes, a circuit breaker for controlling the flow of current through said tap changer, a source of control voltages for said control electrode, means for impressing voltages from said source between said control electrode and said cathode effective to variably control the magnitude of the output voltage of said system within substantially the limits of said steps, means responsive to an operating condition of said system for initiating a coordinated operation of said tap changer, of said circuit breaker and of the first said means to cause said circuit breaker to be open during movement of said tap changer and to adjust the output voltage of said system at values differing by materially less than the amount of one of said steps immediately before and immediately after operation of the first said means, and means for causing completion of the said coordinated operation independently of said operating condition of the system.

10. In an electric translating system, the combination with an electric current input circuit, an electric current output circuit, a variably conductive electric valve interconnecting said circuits and constituting a discharge path for the flow of current therebetween, means for varying the connection of said input circuit with said valve to thereby variably control the magnitude of the voltage of said output circuit in steps of predetermined magnitude, and means for controlling the conductivity of said valve to thereby control the magnitude of the voltage of the said output circuit within substantially the limits of said steps, of means operable responsive to changes in an operating condition of said system for coordinately controlling the operations of the first and second said means to adjust the magnitude of the voltage of said output circuit at values differing by materially less than the amount of one of said steps immediately before and immediately after operation of the first said means.

11. In an electric translating system, the combination with an electric current input circuit, an electric current output circuit, electric valve means interconnecting said circuits and constituting a discharge path for the flow of current therebetween, means for varying the connection of said input circuit with said valve means to thereby variably control the magnitude of the voltage of said output circuit in steps of predetermined magnitude, and means for controlling the conductivity of said valve means to thereby control the magnitude of the voltage of said output circuit within substantially the limits of said steps, of means operable responsive to changes in the magnitude of the current flowing in said output circuit from said valve means for coordinately controlling the operations of the second and third said means to adjust the magnitude of the voltage of the said output circuit at substantially equal values immediately before and immediately after operation of the second said means.

12. An electric translating system comprising an alternating current supply circuit, an electric current load circuit, a plurality of phase displaced winding sections each provided with a plurality of electrically spaced terminals, variably conductive electric valve means interconnecting each of said winding sections with said load circuit, means for varying the connections of said winding sections with said supply circuit to thereby vary the magnitude of the voltage of said load circuit in steps of predetermined magnitude, means for progressively increasing the magnitude of the voltage of said load circuit within substantially the limits of said steps comprising means for variably controlling the conductivity of said valve means, and means operable responsive to and in dependence on changes in the magnitude of the current flowing in said load circuit from said valve means for coordinately controlling the operations of the second and fourth said means, whereby the magnitude of the voltage of said load circuit is adjusted to substantially equal values immediately before and immediately after operation of the second said means.

HAROLD WINOGRAD.
DIDIER JOURNEAUX.